(12) United States Patent
Xiang et al.

(10) Patent No.: US 12,080,951 B2
(45) Date of Patent: Sep. 3, 2024

(54) ADJUSTMENT APPARATUS, ANTENNA, AND COMMUNICATIONS DEVICE

(71) Applicant: Huawei Technologies Co., Ltd., Shenzhen (CN)

(72) Inventors: Lianghong Xiang, Dongguan (CN); Hu Zhao, Shenzhen (CN); Fangqing Duan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 634 days.

(21) Appl. No.: 17/215,768

(22) Filed: Mar. 29, 2021

(65) Prior Publication Data

US 2021/0218139 A1    Jul. 15, 2021

Related U.S. Application Data

(63) Continuation of application No. PCT/CN2019/107346, filed on Sep. 23, 2019.

(30) Foreign Application Priority Data

Sep. 30, 2018 (CN) .......................... 201811157810.2

(51) Int. Cl.
*H01Q 3/00* (2006.01)
*H01Q 1/24* (2006.01)
*H04W 16/28* (2009.01)

(52) U.S. Cl.
CPC ............. *H01Q 3/005* (2013.01); *H01Q 1/246* (2013.01); *H04W 16/28* (2013.01)

(58) Field of Classification Search
CPC ........ H04W 16/28; H01Q 3/005; H01Q 1/246
See application file for complete search history.

(56) References Cited

U.S. PATENT DOCUMENTS

| 7,031,751 B2 | 4/2006 | Hurler et al. |
| 8,193,983 B1 | 6/2012 | Farmer |
| (Continued) | | |

FOREIGN PATENT DOCUMENTS

| CN | 102170321 A | 8/2011 |
| CN | 102401645 A | 4/2012 |
| (Continued) | | |

OTHER PUBLICATIONS

Jansen, W., "Principle and Application of Industrial Electrical Connection Technology", Defense Industry Press, Jun. 2011, 4 pages.

*Primary Examiner* — Steven S Kelley
(74) *Attorney, Agent, or Firm* — Slater Matsil, LLP

(57) ABSTRACT

An adjustment apparatus provided in this application includes an obtaining unit, a storage unit, and a processing unit, where the processing unit is electrically connected to the obtaining unit and the storage unit; the obtaining unit is configured to obtain antenna position information; the processing unit is configured to obtain latitude and longitude of an antenna or an azimuth of the antenna based on the antenna position information; the storage unit is configured to store the latitude and longitude of the antenna or the azimuth of the antenna; and the processing unit is further configured to read and write the latitude and longitude of the antenna or the azimuth of the antenna in the storage unit according to an instruction of a remote control unit, and the processing unit is further configured to adjust an electrical downtilt of the antenna according to the instruction of the remote control unit.

18 Claims, 5 Drawing Sheets

(56) References Cited

U.S. PATENT DOCUMENTS

| | | | |
|---|---|---|---|
| 8,391,926 B2 | 3/2013 | Seeor et al. | |
| 9,177,184 B2* | 11/2015 | Prassberger | H01Q 3/005 |
| 2004/0048635 A1* | 3/2004 | Goldberg | H04W 16/28 |
| | | | 455/562.1 |
| 2009/0141623 A1 | 6/2009 | Jung et al. | |
| 2013/0021204 A1* | 1/2013 | Walker | H04W 16/28 |
| | | | 342/372 |
| 2013/0127666 A1* | 5/2013 | Zhang | H01Q 3/06 |
| | | | 342/359 |
| 2014/0022561 A1* | 1/2014 | Tiemann | G01B 11/14 |
| | | | 356/614 |
| 2014/0333499 A1* | 11/2014 | Fang | H01Q 23/00 |
| | | | 343/757 |
| 2015/0163735 A1* | 6/2015 | Fischer | H01Q 1/246 |
| | | | 370/311 |
| 2015/0244069 A1* | 8/2015 | Moon | H01Q 3/04 |
| | | | 455/562.1 |
| 2015/0355737 A1* | 12/2015 | Cheung | G06F 3/038 |
| | | | 345/173 |
| 2016/0164587 A1* | 6/2016 | Pu | H04B 7/0617 |
| | | | 370/328 |
| 2016/0309339 A1 | 10/2016 | Priest et al. | |
| 2016/0380352 A1* | 12/2016 | Liu | H01Q 3/08 |
| | | | 342/359 |
| 2017/0118629 A1* | 4/2017 | Syed | H04W 4/021 |
| 2017/0156119 A1* | 6/2017 | Neves | H04W 52/143 |
| 2018/0013200 A1* | 1/2018 | Clifford | H01Q 3/005 |
| 2019/0131703 A1* | 5/2019 | Meyer | H01Q 1/246 |
| 2019/0373495 A1* | 12/2019 | Ouyang | H04W 16/28 |
| 2022/0214407 A1* | 7/2022 | Hu | H04B 17/14 |

FOREIGN PATENT DOCUMENTS

| | | |
|---|---|---|
| CN | 102509902 A | 6/2012 |
| CN | 102946004 A | 2/2013 |
| CN | 105846039 A | 8/2016 |
| DE | 102010012991 B4 | 12/2011 |
| EP | 2196817 A1 | 6/2010 |
| EP | 3116060 A1 | 1/2017 |

* cited by examiner

ADJUSTMENT APPARATUS, ANTENNA, AND COMMUNICATIONS DEVICE

CROSS-REFERENCE TO RELATED APPLICATIONS

This application is a continuation of International Application No. PCT/CN2019/107346, filed on Sep. 23, 2019, which claims priority to Chinese Patent Application No. 201811157810.2, filed on Sep. 30, 2018. The disclosures of the aforementioned applications are hereby incorporated by reference in their entireties.

TECHNICAL FIELD

This application relates to the field of communications technologies, and in particular, to an adjustment apparatus, an antenna, and a communications device.

BACKGROUND

An existing remote electrical tilt apparatus of an antenna can only remotely obtain or adjust an electrical downtilt of the antenna, but cannot obtain any antenna engineering parameter, which may also be referred to as an antenna attitude parameter, such as an azimuth, latitude and longitude, an installation height, or a mechanical downtilt of the antenna. In the current technology, a manual measurement method is used to obtain one or more antenna engineering parameters.

A disadvantage of an existing technical solution lies in that a manual measurement error is large, and measurement data is inaccurate. In addition, after the antenna is mounted, the one or more antenna engineering parameters cannot be measured and updated in real time. Due to an environment condition such as strong wind load and strong vibration, the antenna engineering parameters such as the azimuth and the mechanical downtilt of the antenna are changed. Consequently, network coverage of a communications network in which the antenna is located is affected.

SUMMARY

An adjustment apparatus provided in this application can remotely control and adjust an electrical downtilt of an antenna, and can further obtain one or more antenna engineering parameters in real time.

According to a first aspect, an adjustment apparatus is provided. The apparatus includes an obtaining unit, a storage unit, and a processing unit, where the processing unit is electrically connected to the obtaining unit and the storage unit; the obtaining unit is configured to obtain a signal of antenna position information, where the antenna position information is information that can be processed and calculated to obtain an antenna position; the processing unit is configured to obtain, through processing, latitude and longitude of an antenna or an azimuth of the antenna based on the antenna position information in the signal; the storage unit is configured to store the latitude and longitude of the antenna or the azimuth of the antenna; and the processing unit is further configured to read and write the latitude and longitude of the antenna or the azimuth of the antenna in the storage unit according to an instruction of a remote control unit, and the processing unit is further configured to adjust an electrical downtilt of the antenna according to the instruction of the remote control unit.

It can be learned that the adjustment of the electrical downtilt of the antenna and obtaining of one or more antenna engineering parameters are integrated into the adjustment apparatus provided in this embodiment of this application for processing, so that the apparatus can adjust the electrical downtilt of the antenna, and can further obtain the latitude and longitude, and the azimuth from the one or more antenna engineering parameters in real time. The apparatus integrates the two functions, thereby reducing costs of the adjustment apparatus.

It should be noted that the control unit is configured to send the instruction to control and adjust the processing unit, for example, control the processing unit to read and write the storage unit, and for another example, control the processing unit to adjust the antenna downtilt.

In an implementation, the obtaining unit is a GPS antenna. The GPS antenna is configured to obtain a satellite signal of the antenna. The processing unit obtains, through processing, the latitude and longitude, and the azimuth of the antenna based on the satellite signal received by the GPS antenna. For example, the processing unit may be a global navigation satellite system GNSS receiver, such as a satellite card. Certainly, the obtaining unit may alternatively be another apparatus, for example, a BeiDou positioning related apparatus. The processing unit may be a BeiDou positioning apparatus or a BeiDou positioning chip. This is merely an example herein, and this is not limited in this application.

In an implementation, the processing unit includes an active component. For example, the active component includes one or more of a global navigation satellite system GNSS receiver, an amplifier, an acceleration sensor, and a temperature sensor. The active component described in this application is a component that can work normally only when an external power supply is provided in addition to an input signal, and includes but is not limited to the examples of the active devices described herein.

It is well known to a person skilled in the art that the active component is easily damaged. Therefore, in the adjustment apparatus provided in this embodiment of this application, the active component is integrated into the processing unit. When the active component needs to be replaced, only the processing unit needs to be replaced, and the entire adjustment apparatus does not need to be replaced, so that replacement costs can be greatly reduced.

When the processing unit includes the foregoing acceleration sensor, the acceleration sensor is configured to obtain, through measurement, a mechanical downtilt of the antenna and/or an altitude of the antenna. Therefore, the adjustment apparatus provided in this embodiment of this application may further obtain the mechanical downtilt of the antenna and/or the altitude of the antenna from the one or more antenna engineering parameters.

In an implementation, the processing unit is electrically connected to the obtaining unit and the storage unit through a pluggable radio frequency connector, so that it is easy to separately replace the processing unit. The pluggable connection described in this application includes direct pluggable connection or pluggable connection through screwing.

In an implementation, the processing unit is in pluggable connection with the inside of the antenna; or the processing unit is in pluggable connection with the outside of the antenna; or one part of the processing unit is in pluggable connection with the inside of the antenna, and the other part of the processing unit is in pluggable connection with the outside of the antenna. In this way, the processing unit can be directly removed or inserted, and the processing unit can be further conveniently replaced or repaired when necessary.

In an implementation, the adjustment apparatus communicates with the remote control unit by sharing an antenna radio frequency port; or the adjustment apparatus communicates with the remote control unit through a port of the adjustment apparatus. For example, the adjustment apparatus may communicate with the remote control unit through a port of the processing unit of the adjustment apparatus. Therefore, no antenna radio frequency port is increased because of addition of the adjustment apparatus.

In an implementation, the storage unit is further configured to store antenna information of the antenna. For example, the antenna information includes one or more of an antenna model, an antenna electronic label, an antenna frequency band, an antenna beam width, an antenna gain, antenna configuration data, and an antenna serial number.

In an implementation, the storage unit is further configured to store a procedure parameter, such as a weight value, a phase, a movement length of a transmission part in a phase shifter, or a movement manner of the transmission part in the phase shifter, for adjusting the antenna downtilt.

According to a second aspect, an antenna is provided. The antenna includes the adjustment apparatus according to any one of the first aspect or the implementations of the first aspect.

According to a third aspect, a communications device is provided. The communications device includes the adjustment apparatus according to any one of the first aspect or the implementations of the first aspect, and/or the antenna according to the second aspect.

Beneficial effects of any one of the implementations of the second aspect and the third aspect are the same as those of the first aspect, and details are not described herein again.

DETAILED DESCRIPTION OF ILLUSTRATIVE EMBODIMENTS

An engineering parameter provided in the embodiments of this application is also referred to as an antenna attitude parameter. The engineering parameter and the antenna attitude parameter are not distinguished in this application.

Figure 1:
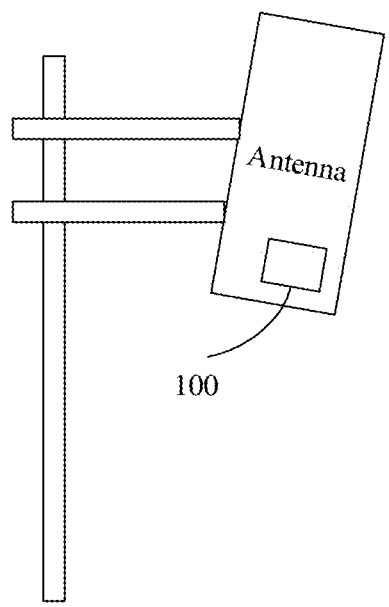
FIG. 1 is a diagram of an application scenario of an adjustment apparatus according to an embodiment of this application.

FIG. 1 is a diagram of an application scenario of an adjustment apparatus 100. The adjustment apparatus 100 provided in this embodiment of this application is mounted on an antenna, and the antenna is usually mounted on a pole or a tower, to be in communication connection with a base transceiver station (BTS). The base transceiver station BTS is generally referred to as a base station for short, is a part that is in a network and that enables a terminal to access a wireless network, and may also be referred to as a radio access network (RAN) node; or a node or a device that enables a terminal to access a wireless network. The base station described in this application may alternatively be another radio access network node, for example, may be a transmission reception point (TRP), an evolved NodeB (eNB), a radio network controller (RNC), a NodeB (Node B, NB), a base station controller (BSC), a home base station (for example, Home evolved NodeB or Home Node B, HNB), a baseband unit (BBU), or a Wi-Fi access point (AP).

The adjustment apparatus 100 shown in the figure is mounted inside the antenna. Optionally, the adjustment apparatus 100 may alternatively be mounted outside the antenna (not shown in FIG. 1). Alternatively, one part of the adjustment apparatus may be mounted inside the antenna and the other part of the adjustment apparatus may be mounted outside the antenna (not shown in FIG. 1).

Figure 2:
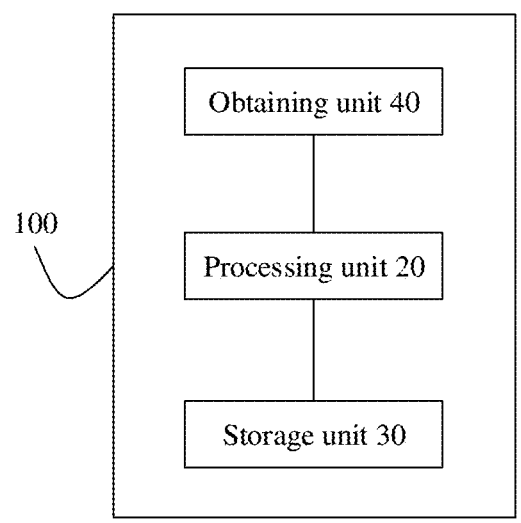
FIG. 2 is a schematic diagram of a structure of an adjustment apparatus according to an embodiment of this application.

FIG. 2 is a schematic diagram of a structure of an adjustment apparatus 100 according to an embodiment of this application. The adjustment apparatus 100 includes a processing unit 20, a storage unit 30, and an obtaining unit 40. The processing unit 20 is electrically connected to the obtaining unit 30 and the storage unit 30. The obtaining unit 40 is configured to obtain a signal of antenna position information. The antenna position information is information that can be processed and calculated to obtain an antenna position. The processing unit 20 is configured to obtain, through processing, latitude and longitude of an antenna or an azimuth of the antenna based on the antenna position information in the signal. The processing unit 20 is further configured to adjust an electrical downtilt of the antenna according to an instruction of a remote control unit 50. The control unit 50 is configured to send the instruction to control and adjust the processing unit 20, for example, control the processing unit 20 to read and write the storage unit 30, and for another example, control the processing unit 20 to adjust the antenna downtilt. The storage unit 30 is configured to store the latitude and longitude of the antenna or the azimuth of the antenna. The processing unit 20 is further configured to read and write the latitude and longitude of the antenna or the azimuth of the antenna in the storage unit 30 according to the instruction of the remote control unit 50.

It can be learned that the adjustment apparatus provided in this embodiment of this application can adjust the electrical downtilt of the antenna, and can further obtain the latitude and longitude, and the azimuth from one or more antenna engineering parameters in real time. The apparatus integrates the two functions, thereby reducing costs of the adjustment apparatus.

The obtaining unit 40 is a global positioning system (Global Positioning System, GPS) antenna. The GPS antenna is configured to obtain a satellite signal of the antenna. The processing unit 20 obtains, through processing, the latitude and longitude, and the azimuth of the antenna based on the satellite signal received by the GPS antenna. For example, the processing unit 20 may be a global navigation satellite system (GNSS) receiver, such as a satellite card. Certainly, the obtaining unit 40 may alternatively be another apparatus, for example, a BeiDou positioning related apparatus. The processing unit 20 may be a BeiDou positioning apparatus or a BeiDou positioning chip. This is merely an example herein, and this is not limited in this application.

In an implementation, the processing unit 20 includes an active component. For example, the processing unit 20 includes one or more of a global navigation satellite system GNSS receiver, an amplifier, an acceleration sensor, and a temperature sensor. It is well known to a person skilled in the art that the active component is easily damaged. Therefore, in the adjustment apparatus provided in this embodiment of this application, the active component is integrated into the processing unit. When the active component needs to be replaced, only the processing unit needs to be replaced, and the entire adjustment apparatus does not need to be replaced, so that replacement costs can be greatly reduced.

When the processing unit 20 includes the foregoing acceleration sensor, the acceleration sensor is configured to obtain, through measurement, a mechanical downtilt of the antenna and/or an altitude of the antenna. Therefore, the adjustment apparatus 100 provided in this embodiment of this application may further obtain the mechanical downtilt of the antenna and/or the altitude of the antenna from the one or more antenna engineering parameters.

Figure 3A:
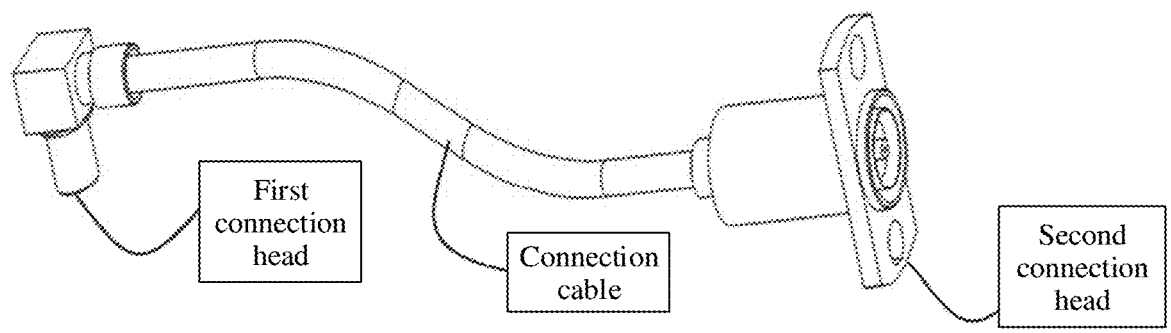
FIG. 3a is a schematic diagram of a structure of a pluggable radio frequency connector according to an embodiment of this application.

In an implementation, the processing unit 20 is electrically connected to the obtaining unit 40 and the storage unit 30 through a pluggable radio frequency connector. FIG. 3a is a schematic diagram of a structure of a pluggable radio frequency connector 300 according to an embodiment of this application. The pluggable radio frequency connector 300 includes a first connection head and a second connection head, and a connection cable used to connect the first connection head and the second connection head. The two connection heads (the first connection head and the second connection head) included in the pluggable radio frequency connector 300 have different structures, but both have connection head structures that are easily inserted and removed. The two connection heads may alternatively have a same structure (not shown in FIG. 3a). This is not limited in this application. In addition, the structure of the pluggable radio frequency connector in FIG. 3a is merely an example. The first connection head or the second connection head may alternatively be a connection head of another structure. The connection cable shown in FIG. 3a is a coaxial cable, and the connection cable may alternatively be another radio frequency connection cable. This is not limited in this application. Optionally, the first connection head and the second connection head of the pluggable radio frequency connector may alternatively be directly connected to each other without any connection cable between the two connection heads (not shown in the figure). The pluggable connection described in this application includes direct pluggable connection or pluggable connection through screwing.

Figure 3B:
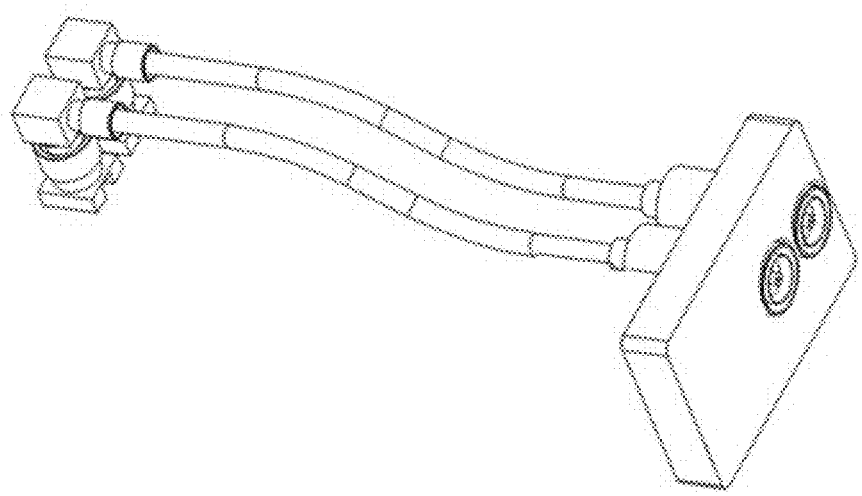
FIG. 3b is a schematic diagram of a structure of a pluggable radio frequency connector according to an embodiment of this application.

Optionally, the pluggable radio frequency connector provided in the embodiments of this application further includes a structural form shown in FIG. 3b. FIG. 3b is a schematic diagram of a structure in which two pluggable radio frequency connectors shown in FIG. 3a are fastened as a whole.

Therefore, the processing unit 20 is electrically connected to the obtaining unit 40 and the storage unit 30 through the pluggable radio frequency connector, to communicate with each other, and is easily connected to or disconnected from the obtaining unit 40 and the storage unit 30.

To further enable the processing unit 20 to be easily mounted and removed when necessary, for example, when the processing unit 20 needs to be replaced or repaired, the processing unit 20 is in pluggable connection with the antenna. The processing unit 20 is in pluggable connection with the inside of the antenna, or the processing unit 20 is in pluggable connection with the outside of the antenna.

Figure 4:
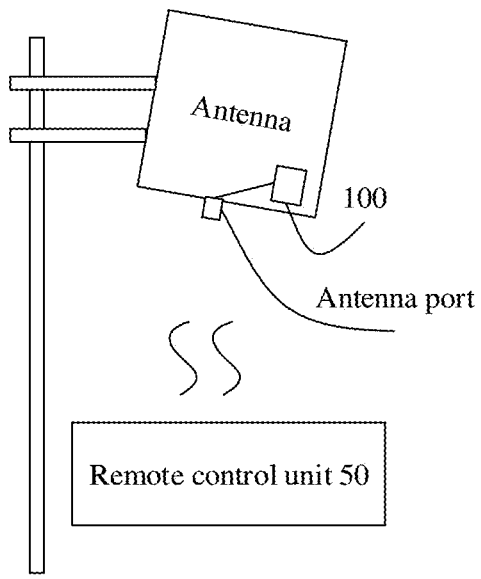
FIG. 4 is a schematic diagram of a structure of an adjustment apparatus according to an embodiment of this application.

In an implementation, referring to FIG. 4, when the adjustment apparatus 100 is in pluggable connection with the inside of the antenna, the adjustment apparatus 100 may communicate with the remote control unit 50 by sharing an antenna radio frequency port. Therefore, no antenna radio frequency port is increased because of addition of the adjustment apparatus. In addition, it is easy to mount and remove the entire adjustment apparatus 100, so that the adjustment apparatus is easily used.

Figure 5:
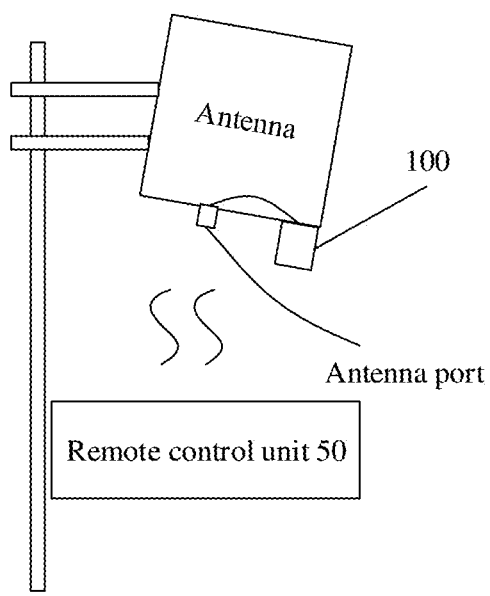
FIG. 5 is a schematic diagram of a structure of an adjustment apparatus according to an embodiment of this application.

Optionally, as shown in FIG. 5, when the adjustment apparatus 100 may alternatively be in pluggable connection with the outside of the antenna, the adjustment apparatus 100 may also communicate with the remote control unit 50 by sharing the antenna radio frequency port. Therefore, no antenna radio frequency port is increased because of addition of the adjustment apparatus. In addition, it is easy to mount and remove the entire adjustment apparatus 100, so that the adjustment apparatus is easily used.

Figure 6:
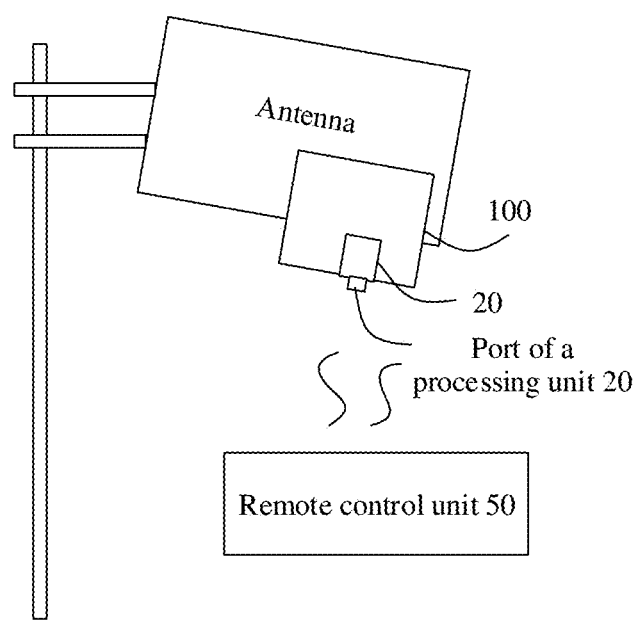
FIG. 6 is a schematic diagram of a structure of an adjustment apparatus according to an embodiment of this application.

Optionally, referring to FIG. 6, when one part of the adjustment apparatus 100 is mounted inside the antenna and the other part of the adjustment apparatus is mounted outside the antenna, as shown in FIG. 6, the processing unit 20 of the adjustment apparatus 100 is outside the antenna, and another unit, for example, the storage unit 30, of the adjustment apparatus 100 is inside the antenna, the adjustment apparatus 100 may communicate with the remote control unit 50 directly through a port of the processing unit 20. Similarly, no antenna radio frequency port is increased because of addition of the adjustment apparatus 100. In addition, it is easy to mount and remove the entire adjustment apparatus 100, so that the adjustment apparatus is easily used. Optionally, the storage unit 30 is mounted outside the antenna, and the processor 20 is mounted inside the antenna (not shown in FIG. 6). In this case, the adjustment apparatus 100 may communicate with the remote control unit 50 through a port of the storage unit 30. This is not limited in this application.

It should be noted that the adjustment apparatus 100 shown in FIG. 4 to FIG. 6 is merely an example, and the adjustment apparatus provided in the embodiments of this application includes but is not limited to the shown adjustment apparatus 100.

In an implementation, the storage unit 30 provided in this embodiment of this application is further configured to store antenna information of the antenna. For example, the antenna information includes one or more of an antenna model, an antenna electronic label, an antenna frequency band, an antenna beam width, an antenna gain, antenna configuration data, and an antenna serial number.

Optionally, the storage unit 30 is further configured to store a procedure parameter, such as a weight value, a phase, a movement length of a transmission part in a phase shifter, or a movement manner of the transmission part in the phase shifter, for adjusting the antenna downtilt.

The remote control unit 50 shown in FIG. 4 to FIG. 6 may be mounted in a base station, for example, a baseband processing unit or a radio frequency processing unit of the base station; or the remote control unit 50 may be a portable control unit (portable control unit, PCU); or the remote control unit 50 may be a separate terminal device. The adjustment apparatus 100 may communicate with the remote control unit 50 in a wireless or wired manner. The terminal device is also referred to as user equipment (UE), a mobile station (MS), a mobile terminal (MT), or the like, and is a device that provides voice and/or data connectivity for a user, for example, a handheld device or a vehicle-mounted device having a wireless connection function. Currently, examples of some terminals are: a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in a remote surgery (remote medical surgery), a wireless terminal in a smart grid, a wireless terminal in transportation safety, a wireless terminal in a smart city, a wireless terminal in a smart home, and the like.

To further improve understanding of the adjustment apparatus provided in this application, the following provides descriptions with reference to a specific embodiment.

Figure 7:
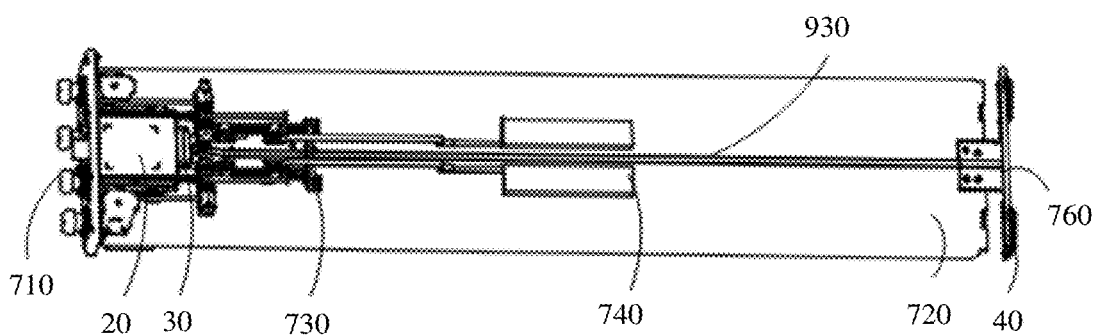
FIG. 7 is a schematic diagram of a structure of an adjustment apparatus according to an embodiment of this application.
Figure 8:
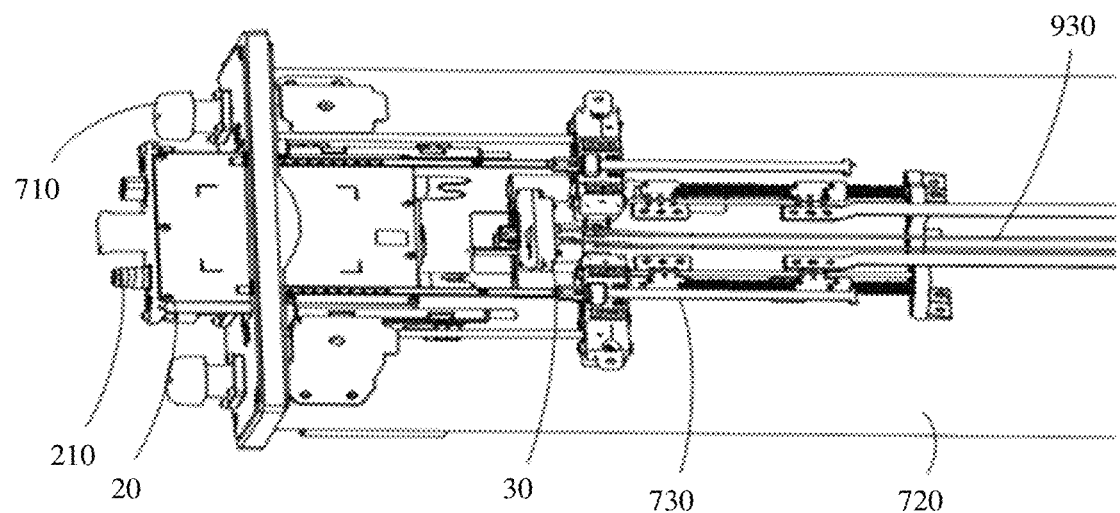
FIG. 8 is a partial enlarged and exploded view of FIG. 7.
Figure 9:
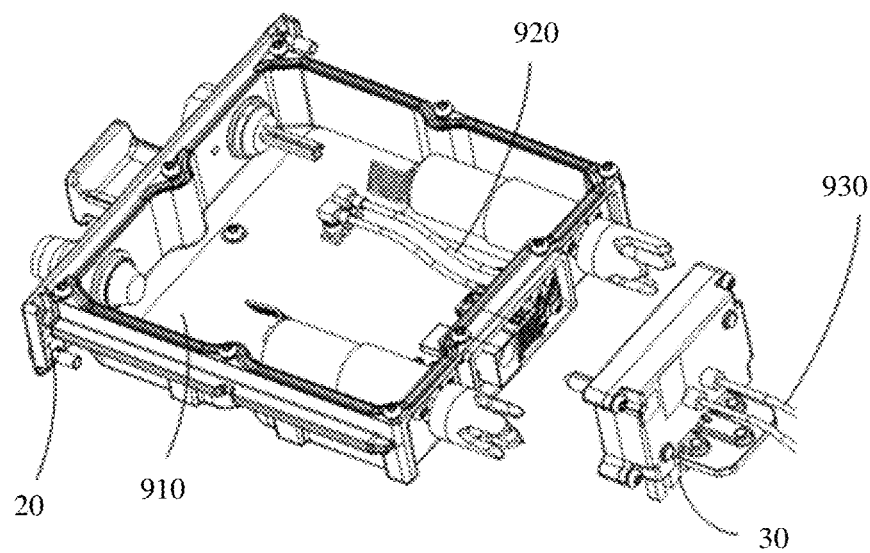
FIG. 9 is a partial enlarged and exploded view of FIG. 7.

FIG. 7 to FIG. 9 each are a schematic diagram of a structure of an adjustment apparatus 100 according to an embodiment of this application. FIG. 8 and FIG. 9 are partial enlarged and exploded views of FIG. 7. In FIG. 7, the adjustment apparatus 100 includes a processing unit 20, a storage unit 30, and an obtaining unit 40. FIG. 7 further includes an antenna 700. The antenna 700 shown in FIG. 7 includes a radio frequency port 710, a reflection panel 720, a phase shifter transmission module 730, and a phase shifter 740. The antenna 700 may further include a radome 750 (not shown in FIG. 7).

With reference to FIG. 8 and FIG. 9, the processing unit 20 includes an integrated chip 910, and the processing unit 20 is mounted on the reflection panel 720 of the antenna in a pluggable manner. Certainly, the processing unit 20 may alternatively be in another structure form. This is not limited in this application. The processing unit 20 is electrically connected to the storage unit 30 through a pluggable radio frequency connector 920. The storage unit 30 is electrically connected to the obtaining unit 40 through a pluggable radio frequency connector 930. In an implementation, the pluggable radio frequency connector 930 is the pluggable radio frequency connector shown in FIG. 3b; or the storage unit 30 is electrically connected to the obtaining unit 40 directly via a pluggable coaxial cable of the pluggable radio frequency connector 930. Optionally, the obtaining unit 40 shown in FIG. 7 is mounted on an upper end of the antenna 700 by using a bracket 760. The upper end of the antenna 700 is an end away from an antenna radio frequency port, and a lower end of the antenna 700 is an end of the antenna radio frequency port. The obtaining unit 40 shown in FIG. 7 is two GPS antennas. Satellite signals are received through the two GPS antennas. The processing unit 20 performs processing such as filtering and power amplification on two GPS signals, and obtains antenna position information from the two GPS signals. For example, the antenna position information is a distance difference between the two GPS signals during propagation. In this case, latitude and longitude, and an azimuth of the antenna are obtained by processing the signals and calculating the distance difference between the signals.

In addition, the processing unit 20 may further drive the phase shifter transmission module 730 by controlling a motor 940 shown in FIG. 9, to control a working status of a phase shifter 740, so as to adjust an electrical downtilt of the antenna. The processing unit 20 is further configured to read and write the latitude and longitude of the antenna or the azimuth of the antenna in the storage unit 30 according to an instruction of a remote control unit 50, to measure and obtain one or more antenna engineering parameters in real time. The engineering parameters include the latitude and longitude of the antenna and the azimuth of the antenna.

Optionally, when the processing unit 20 includes an acceleration sensor, the acceleration sensor is configured to obtain, through measurement, a mechanical downtilt of the antenna and/or an altitude of the antenna, and the adjustment apparatus may further obtain the following two engineering parameters: the mechanical downtilt of the antenna and/or the altitude of the antenna.

It should be noted that the adjustment apparatus shown in FIG. 7 to FIG. 9 is merely an implementation, and the adjustment apparatus provided in this application includes but is not limited thereto.

The adjustment apparatus 100 may communicate with the remote control unit by sharing the antenna radio frequency port 710, or may communicate with the remote control unit through a port 210 of the processing unit 20 of the adjustment apparatus 100. The adjustment apparatus 100 may alternatively communicate with the remote control unit through another port. This is not limited in this application.

It can be learned that the adjustment of the antenna downtilt and the real-time obtaining of the one or more antenna engineering parameters are integrated into the adjustment apparatus shown in FIG. 7 to FIG. 9 for controlling and processing. The apparatus integrates the two functions, thereby reducing costs of the adjustment apparatus. The adjustment apparatus can remotely adjust the electrical downtilt of the antenna, and can further obtain the antenna engineering parameter in real time. In addition, because all active components (such as a power amplifier, an amplifier, and an acceleration sensor) are integrated on the processing unit, and the processing unit is in pluggable connection with another module of the adjustment apparatus, efficient maintenance can be performed when necessary, thereby reducing maintenance costs. In addition, because the antenna engineering parameter can be obtained in real time, a beam radiated by the antenna can be corrected based on a most real antenna attitude of the antenna, thereby helping improve network coverage of a communications network.

An embodiment of this application further provides an antenna, including the adjustment apparatus according to any one of the foregoing implementations.

An embodiment of this application further provides a communications device, including the adjustment apparatus according to any one of the foregoing implementations and/or the foregoing antenna.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
   a processing device, comprising:
   at least one pluggable connection;
   an active component, configured to obtain at least one parameter;
   at least one processor; and
   at least one computer-readable storage medium storing instructions executable by the at least one processor, the instructions including instructions for:

obtaining at least one of a mechanical downtilt or an altitude of a first antenna based on the at least one parameter obtained by the active component;

obtaining antenna position information of the first antenna, wherein the apparatus is configured to be mounted in or on the first antenna, and wherein the antenna position information is obtained from a Global Positioning System (GPS) antenna of the apparatus;

obtaining latitude and longitude of the first antenna by processing the antenna position information, or obtaining an azimuth of the first antenna by processing the antenna position information;

storing the latitude and longitude of the antenna, or the azimuth of the antenna, in another at least one computer-readable storage medium;

reading or writing the latitude and longitude of the first antenna, or the azimuth of the first antenna, in the another at least one computer-readable storage medium according to a first instruction received from a remote controller; and adjusting an electrical downtilt of the first antenna according to a second instruction received from the remote controller; and wherein the remote controller is remotely located from the apparatus and the first antenna, and the processing device is configured to output data through the at least one pluggable connection to a radio frequency port of the first antenna, to wirelessly communicate with the remote controller using the first antenna.

2. The apparatus according to claim 1, wherein the active component comprises one or more of a global navigation satellite system (GNSS) receiver, an amplifier, an acceleration sensor, or a temperature sensor.

3. The apparatus according to claim 1, wherein the processing device is electrically connected to the another at least one computer-readable storage medium through a pluggable radio frequency connector.

4. The apparatus according to claim 1, wherein:
the at least one pluggable connection is inside of the first antenna; or
the at least one pluggable connection is outside of the first antenna.

5. The apparatus according to claim 1, wherein the GPS antenna is configured to obtain a signal comprising the antenna position information.

6. The apparatus according to claim 1, wherein the active component comprises an acceleration sensor, and the at least one processor is configured to cause the acceleration sensor to obtain, through measurement, the mechanical downtilt of the antenna or the altitude of the antenna.

7. The apparatus according to claim 1, wherein the another at least one computer-readable storage medium is further configured to store antenna information of the antenna, wherein the antenna information comprises one or more of an antenna model, an antenna electronic label, an antenna frequency band, an antenna beam width, an antenna gain, antenna configuration data, or an antenna serial number.

8. The apparatus according to claim 1, wherein the another at least one computer-readable storage medium is further configured to store a procedure parameter for adjusting the electrical downtilt of the antenna.

9. An antenna system, comprising an apparatus, a first antenna, and a remote controller, wherein the apparatus comprises:

a processing device, comprising:
at least one pluggable connection;
an active component, configured to obtain at least one parameter;
at least one processor; and
at least one computer-readable storage medium storing instructions executable by the at least one processor, the instructions including instructions for:
obtaining at least one of a mechanical downtilt or an altitude of the first antenna based on the at least one parameter obtained by the active component;
obtaining antenna position information of the first antenna, wherein the apparatus is configured to be mounted in or on the first antenna, wherein the antenna position information is obtained from a Global Positioning System (GPS) antenna of the apparatus;
obtaining latitude and longitude of the first antenna by processing the antenna position information, or obtaining an azimuth of the first antenna by processing the antenna position information;
storing the latitude and longitude of the first antenna, or the azimuth of the first antenna, in another at least one computer-readable storage medium;
reading or writing the latitude and longitude of the first antenna, or the azimuth of the first antenna, in the another at least one computer-readable storage medium according to a first instruction received from a remote controller; and
adjusting an electrical downtilt of the first antenna according to a second instruction received from the remote controller; and
wherein the remote controller is remotely located from the apparatus and the first antenna, and the processing device is configured to output data through the at least one pluggable connection to a radio frequency port of the first antenna, to wirelessly communicate with the remote controller using the first antenna.

10. The antenna system according to claim 9, wherein the active component comprises one or more of a global navigation satellite system (GNSS) receiver, an amplifier, an acceleration sensor, or a temperature sensor.

11. The antenna system according to claim 9, wherein the processing device is electrically connected to the another at least one computer-readable storage medium through a pluggable radio frequency connector.

12. The antenna system according to claim 9, wherein:
the at least one pluggable connection is with an inside of the antenna; or
the at least one pluggable connection is with an outside of the antenna.

13. The antenna system according to claim 9, wherein the GPS antenna is configured to receive a signal comprising the antenna position information.

14. The antenna system according to claim 9, wherein the active component comprises an acceleration sensor, and the at least one processor is configured to cause the acceleration sensor to obtain, through measurement, the mechanical downtilt of the antenna or the altitude of the antenna.

15. The antenna system according to claim 9, wherein the another at least one computer-readable storage medium is further configured to store antenna information of the first antenna, wherein the antenna information comprises one or more of an antenna model, an antenna electronic label, an antenna frequency band, an antenna beam width, an antenna gain, antenna configuration data, or an antenna serial number.

16. The antenna system according to claim 9, wherein the another at least one computer-readable storage medium is further configured to store a procedure parameter for adjusting the electrical downtilt of the antenna.

17. A communications device, comprising an apparatus, wherein the apparatus comprises:
- at least one pluggable connection;
- an active component, configured to obtain at least one parameter;
- at least one processor; and
- at least one computer-readable storage medium storing instructions executable by the at least one processor, the instructions including instructions for:
  - obtaining at least one of a mechanical downtilt or an altitude of a first antenna based on the at least one parameter obtained by the active component;
  - obtaining antenna position information of the first antenna, wherein the apparatus is configured to be mounted in or on the first antenna, wherein the antenna position information is obtained from a Global Positioning System (GPS) antenna of the apparatus;
    - obtaining latitude and longitude of the first antenna by processing the antenna position information, or obtaining an azimuth of the first antenna by processing the antenna position information;
    - storing the latitude and longitude of the first antenna, or the azimuth of the first antenna, in another at least one computer-readable storage medium;
  - reading or writing the latitude and longitude of the first antenna, or the azimuth of the first antenna, in the another at least one computer-readable storage medium according to a first instruction received from a remote controller, wherein the remote controller is located remotely from the first antenna; and
  - adjusting an electrical downtilt of the first antenna according to a second instruction received from the remote controller; and
- wherein the remote controller is remotely located from the apparatus and the first antenna, and the at least one processor is configured to output data through the at least one pluggable connection to a radio frequency port of the first antenna, to wirelessly communicate with the remote controller using the first antenna.

18. The communications device according to claim 17, wherein the active component comprises one or more of a global navigation satellite system (GNSS) receiver, an amplifier, an acceleration sensor, or a temperature sensor.

* * * * *

UNITED STATES PATENT AND TRADEMARK OFFICE
CERTIFICATE OF CORRECTION

PATENT NO. : 12,080,951 B2
APPLICATION NO. : 17/215768
DATED : September 3, 2024
INVENTOR(S) : Xiang et al.

It is certified that error appears in the above-identified patent and that said Letters Patent is hereby corrected as shown below:

In the Claims

In Column 10, in Claim 12, Line 48, after "connection is" delete "with an".

In Column 10, in Claim 12, Line 50, after "connection is" delete "with an".

Signed and Sealed this
Fifteenth Day of October, 2024

Katherine Kelly Vidal
*Director of the United States Patent and Trademark Office*